United States Patent [19]

Joshi et al.

[11] 4,298,664

[45] Nov. 3, 1981

[54] PHOSPHORUS-CONTAINING SOLID STATE ELECTROLYTE

[75] Inventors: Ashok V. Joshi, Fishkill; Arun D. Jatkar, Goshen, both of N.Y.; William P. Sholette, Warminster, Pa.

[73] Assignee: Ray-O-Vac Corporation, Madison, Wis.

[21] Appl. No.: 200,277

[22] Filed: Oct. 24, 1980

[51] Int. Cl.$^3$ ............................................. H01M 6/18
[52] U.S. Cl. .................................. 429/191; 429/193; 429/199; 252/62.2
[58] Field of Search ...................... 429/191, 193, 199; 423/300; 252/62.2, 182.1

[56] References Cited

U.S. PATENT DOCUMENTS 3,837,920 9/1974 Liang et al. ......................... 429/191

*Primary Examiner*—Charles F. LeFevour
*Attorney, Agent, or Firm*—Raymond J. Kenny; Francis J. Mulligan, Jr.

[57] ABSTRACT

An electrolyte for a solid state lithium electrochemical cell comprising an interdiffused mixture of $PI_3$ or $BI_3$ and LiI and optionally $Al_2O_3$ and cells containing such electrolyte.

11 Claims, No Drawings

PHOSPHORUS-CONTAINING SOLID STATE ELECTROLYTE

The present invention is concerned with solidstate batteries and, more particularly, with an improved lithium ion transport electrolyte for solid state batteries.

HISTORY OF THE ART AND PROBLEM

In order to produce a high energy density solid state battery, it is necessary to provide not only high energy density anodes and cathodes but also an effective ion-transport electrolyte. The electrolyte must be an electronic insulator and an electrolytic conductor. Among the number of solids which satisfy these criteria at room temperature, solid lithium iodide is known to be advantageous in that it has the capability of providing electrolytic conduction by the transport of lithium ions. This permits lithium, the most energy dense of the alkali metals, to be used as an anode. However, the electrolytic conductivity of pure lithium iodide is only about $10^{-7}$ (ohm-cm)$^{-1}$. To be useful, even in low drain microelectronic applications, the electrolytic conductivity must be increased by at least an order of magnitude. Without increasing the electrolytic conductivity of a lithium iodide electrolyte, a cell inclusive of such an electrolyte is likely to have extraordinarily high internal resistance and a high potential drop for a given drain rate.

This problem has been recognized and solutions have been proposed. For example, in U.S. Pat. No. 3,837,920, it has been proposed to add to a lithium iodide matrix a material from the group of calcium iodide, oxide and chloride, barium iodide and oxide, beryllium iodide and chloride, magnesium iodide and chloride, barium chloride and strontium iodide and chloride. This proposal is not totally satisfactory in that the metal ions in materials mentioned in the prior art are reducible to the metallic state by lithium and thus present the possibility of producing electronic shorting across the electrolyte between the anode and the cathode.

DISCOVERY AND OBJECT OF THE INVENTION

It has now been discovered that a composition of matter comprising an intimate, heat-treated interdiffused mixture of lithium iodide and either boron triiodide or phosphorous triiodide can provide a novel electrolyte characterized by relatively high electrolytic conductivity, very low electronic conductivity and freedom from the electronic shorting possibility and is thereby suitable for use in a high energy density solid state cell using lithium or lithium-rich alloys as the anode and conventional materials as the cathode.

An object of the present invention is to provide a novel, solid state lithium iodide-based electrolyte.

Another object of the invention is to provide a novel solid state electrochemical cell containing the novel electrolyte of the present invention.

Other objects and advantages will become apparent from the present description.

PARTICULAR DESCRIPTION OF THE INVENTION

The novel electrolyte of the invention essentially comprises an interdiffused mass of about 1 to about 16 mole percent of phosphorus triiodide or boron triiodide with the balance being essentially lithium iodide. The electrolyte can contain small amounts of other materials miscible with the interdiffused mass. These materials include impurities normally associated with commercially available phosphorus triiodide, boron triiodide and lithium iodide. In general, however, inclusion of such materials is not desirable but rather the result of inevitable contamination which occurs in manufacturing processes.

It is advantageous to maintain the amount of phosphorus triiodide in the electrolytes of the present invention in the range of about 2 to about 12 mole percent. The electrolyte of the present invention is made by thoroughly blending appropriate amounts of phosphorus triiodide or boron triiodide and lithium iodide powders, heating the blended powders in an inert atmosphere at a temperature in excess of the melting point of phosphorus triiodide (61° C.) or boron triiodide (43° C.) for a time sufficient to thoroughly interdiffuse the two materials, cooling the resultant interdiffused blend and grinding to form a fine powder product. More particularly, heating for one half hour at temperatures in the range of 150° C. to 200° C. has been found to be adequate to provide the phosphorus triiodide-containing interdiffused mixture of the present invention.

Table I sets forth exemplary electrolytes of the present invention made by the process described in the previous paragraph.

TABLE I

| Example No. | LiI (mole %) | PI$_3$ (mole %) | Conductivity (ohm-cm)$^{-1}$ |
|---|---|---|---|
| I | 95 | 5 | $3.5 \times 10^{-6}$ |
| II | 98 | 2 | $2.6 \times 10^{-6}$ |
| III | 92.4 | 7.6 | $2.7 \times 10^{-6}$ |
| IV | 85 | 15 | $9.3 \times 10^{-7}$ |

In addition to phosphorus triiodide, lithium iodide and associated impurities and incidental ingredients, the electrolytes of the present invention can contain up to about 60 mole percent of alumina. In particular, boron triiodide is a useful ingredient in compositions containing alumina. This alumina can be ground into the PI$_3$- or BI$_3$-LiI mixture prior to interdiffusion or the interdiffused mass without alumina can be ground to a powder, mixed and ground with alumina powder and subjected to a second interdiffusion. Considering the alumina content, the electrolytes of the present invention contain, in mole percent, about 0.4% to about 16% of phosphorus and/or boron triiodide and advantageously about 0.8% to about 12% phosphorus triiodide, about 33% to about 99% lithium iodide and up to about 60% aluminum oxide. Note that although this specification and claims are written in terms of the electrolytes containing PI$_3$, BI$_3$, Al$_2$O$_3$ and LiI, this wording is not intended to imply that during interdiffusion there may not be some interreaction among the ingredients. The language employed merely implies that the materials used to make the electrolytes are present, albeit perhaps changed in specie, in the final electrolyte.

Examples of alumina-containing compositions are as follows:

TABLE II

| Ex. No. | LiI (mole %) | PI$_3$/BI$_3$ (mole %) | Al$_2$O$_3$ (mole %) | Conductivity (ohm-cm)$^{-1}$ |
|---|---|---|---|---|
| V | 88.2 | 1.8 PI$_3$ | 10 | $2.0 \times 10^{-5}$ |
| VI | 85.5 | 4.5 PI$_3$ | 10 | $8.6 \times 10^{-6}$ |
| VII | 78.4 | 1.6 PI$_3$ | 20 | $2.6 \times 10^{-5}$ |
| VIII | 76 | 4.0 PI$_3$ | 20 | $1.3 \times 10^{-5}$ |

TABLE II-continued

| Ex. No. | LiI (mole %) | $PI_3/BI_3$ (mole %) | $Al_2O_3$ (mole %) | Conductivity $(ohm-cm)^{-1}$ |
|---|---|---|---|---|
| IX | 68.6 | 1.4 $PI_3$ | 30 | $5.0 \times 10^{-5}$ |
| X | 66.5 | 3.5 $PI_3$ | 30 | $3.7 \times 10^{-5}$ |
| XI | 63.2 | 1.3 $PI_3$ | 35 | $5.2 \times 10^{-5}$—$1.5 \times 10^{-4}$* |
| XII | 57 | 3.0 $PI_3$ | 40 | $3.7 \times 10^{-5}$ |
| XIII | 49 | 1.0 $PI_3$ | 50 | $5.1 \times 10^{-5}$ |
| XIV | 73.5 | 1.5 $BI_3$ | 25 | $1.2 \times 10^{-5}$ |
| XV | 63.7 | 1.3 $BI_3$ | 35 | $5.5 \times 10^{-5}$ |
| XVI | 53.9 | 1.1 $BI_3$ | 45 | $1.1 \times 10^{-4}$ |

*The range represents results obtained from various samples made with H51 grade alumina supplied by Alcoa in which fineness of grind of the alumina granules was varied. Higher conductivities are obtained with electrolytes made with more finely ground alumina.

Table II shows that compositions containing, in mole percent, about 35% to about 45% alumina, about 50% to about 65% lithium iodide and about 1% to about 1.5% of either boron triiodide or phosphorus triiodide are particularly advantageous in exhibiting high electrolytic, lithium ion transport conductivity. Examples of the electrolytes of the present invention can be used in solid state electrochemical cells using lithium metal as the anode and a wide variety of compatible cathode materials. Suitable cathodes, mounted on a cathode current collector or packed in one portion of a button cell, include materials such as mixtures of bismuth tribromide, titanium disulfide and bismuth, bismuth tribromide, titanium disulfide and iodine, and an iodine adduct with poly-2-vinylpyridine, with or without admixed electronic conductivity enhancers. An example of solid state cell using the novel, solid electrolyte of the present invention is now given.

EXAMPLE XIV

A solid state cell employing the electrolyte of Example I, a lithium anode and a cathode comprising a mixture of, by weight, $BiBr_3$, $TiS_2$ and $I_2$ had an open circuit potential at 37° C. of 2.81 v and an initial discharge voltage of 2.71 v under a 120 kilo-ohm external load.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A solid state electrolyte comprising an interdiffused mixture of, in mole percent, about 0.4% to about 16% of a material selected from the group of boron triiodide and phosphorus triiodide, about 33% to about 99% lithium iodide and up to about 60% alumina.

2. A solid state electrolyte as in claim 1 containing phosphorus triiodide.

3. A solid state electrolyte as in claim 1 comprising, in mole percent, about 0.8% to about 12% phosphorus triiodide.

4. A solid state electrolyte as in claim 1 containing boron triiodide and alumina.

5. A solid state electrolyte as in claim 1 which contains, in mole percent, about 50% to about 65% lithium iodide, about 1% to about 1.5% of material selected from the group of boron triiodide and phosphorus triiodide and about 35% to about 45% alumina.

6. A solid state electrolyte comprising an interdiffused mixture of about 1 to about 16 mole percent phosphorus triiodide with the balance being essentially lithium iodide.

7. A solid state electrolyte as in claim 6 wherein the mole percent of phosphorus triiodide is in the range of about 2% to 12%.

8. A solid state electrochemical cell having a lithium anode, a solid state electrolyte comprising an interdiffused mixture of, in mole percent, about 0.4% to about 16% phosphorus triiodide, about 33% to about 99% lithium iodide and up to about 60% alumina and a compatible cathode.

9. A solid state electrochemical cell as in claim 8 wherein the electrolyte contains, in mole percent, about 0.8% to about 12% phosphorus triiodide.

10. A solid state electrochemical cell as in claim 8 wherein the electrolyte contains, in mole percent, about 63% lithium iodide, about 1.3% phosphorus triiodide and about 35% alumina.

11. A solid state electrochemical cell as in claim 8 wherein the electrolyte contains, in mole percent, about 50% to about 65% lithium iodide, about 1% to about 1.5% of a material from the group of phosphorus triiodide and boron triiodide and about 35% to about 45% of alumina.

* * * * *